United States Patent [19]

Kondo

[11] 4,027,924

[45] June 7, 1977

[54] ANTI-SKID BRAKE CONTROL DEVICE FOR VEHICLES

[75] Inventor: Toshiyuki Kondo, Toyota, Japan

[73] Assignee: Aisin Seiki Kabushiki Kaisha, Kariya, Japan

[22] Filed: Mar. 2, 1976

[21] Appl. No.: 663,031

[30] Foreign Application Priority Data

Mar. 13, 1975 Japan .............................. 50-30873

[52] U.S. Cl. ................................. 303/92; 303/115; 303/119

[51] Int. Cl.² ..................... B60T 8/00; B60T 13/68

[58] Field of Search .......... 303/114, 115, 116, 119, 303/92

[56] References Cited

UNITED STATES PATENTS

| 3,861,757 | 1/1975 | Jackson | 303/115 |
| 3,904,250 | 9/1975 | Kondo | 303/115 |
| 3,936,095 | 2/1976 | Every | 303/115 |

*Primary Examiner*—Trygve M. Blix
*Assistant Examiner*—Reinhard J. Eisenzopf
*Attorney, Agent, or Firm*—Sughrue, Rothwell, Mion, Zinn & Macpeak

[57] ABSTRACT

The anti-skid brake control device includes an actuator having control valves therein for controlling the application of pressure from a master cylinder to the wheel cylinders. The pump which supplies hydraulic pressure to the master cylinder also supplies hydraulic pressure to a hydraulically operated device such as a power steering through the actuator to provide actuator operating pressure to regulate the control valves within the actuator. First and second throttle valves which are operable inversely with respect to each other in response to hydraulic pressure from the master cylinder are located in the actuator to control the hydraulic pressure applied to a pressure responsive piston which in turn controls a pressure reducing piston in the hydraulic pressure circuit between the master cylinder and the wheel brake cylinders.

6 Claims, 2 Drawing Figures

ANTI-SKID BRAKE CONTROL DEVICE FOR VEHICLES

BACKGROUND OF THE INVENTION

1. Field of the Invention

The present invention is directed to an anti-skid brake control system and more specifically to such a system having a brake actuator wherein the actuator operating hydraulic pressure is automatically adjusted to a level proportional to the level of hydraulic pressure from the master cylinder to enhance the responsiveness of the actuator.

2. Prior Art

It is known in prior art anti-skid control devices of the type having an actuator interposed between the master cylinder and the wheel cylinders to provide the hydraulic operating pressure for the actuator from an ancillary source of fluid pressure such as the pressure of a power steering pump. The ancilliary fluid pressure must resist the normal fluid pressure in the brake system when the ancillary fluid pressure is employed to hold the skid control system in its normal braking position.

SUMMARY OF THE INVENTION

The present invention provides an improved anti-skid control device of the type having an actuator interposed between the master cylinder and the wheel cylinders with an input hydraulic pressure for operating the actuator which is always adjusted into the desired proportion with the hydraulic pressure from the master cylinder on any given occasion. Whenever the input hydraulic pressure for operating the actuator is too high or too low as compared with the level of the hydraulic pressure from the master cylinder, the condition is remedied to give the desired pressure difference with respect to the hydraulic pressure from the master cylinder. This greatly enhances the responsiveness of the actuator, permits the attachment of any type of hydraulic equipment in the same hydraulic pressure system downstream of the actuator, and provides an extremely efficient and simple design.

The present invention provides an anti-skid control device of the type having an actuator interposed between the master cylinder and the wheel cylinders wherein the actuator is provided with first and second control valve means for controlling the communication of the master cylinder with the wheel cylinders. One of the control valves is operatively associated with hydraulic pressure responsive piston means, one end of which is exposed to hydraulic pressure from the master cylinder and the opposite end of which is disposed in a pressure chamber. Fluid pressure is provided from the power steering hydraulic pressure circuit by means of a first throttle valve means which is operable in response to hydraulic pressure from the master cylinder. The second throttle valve means operable inversely with respect to the first throttle valve means controls the pressure to the power steering. Electromagnetic valve means operable in response to signals received from the wheel sensors control the flow of fluid from the first throttle valve means to the pressure chamber to control the pressure in the wheel cylinders.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
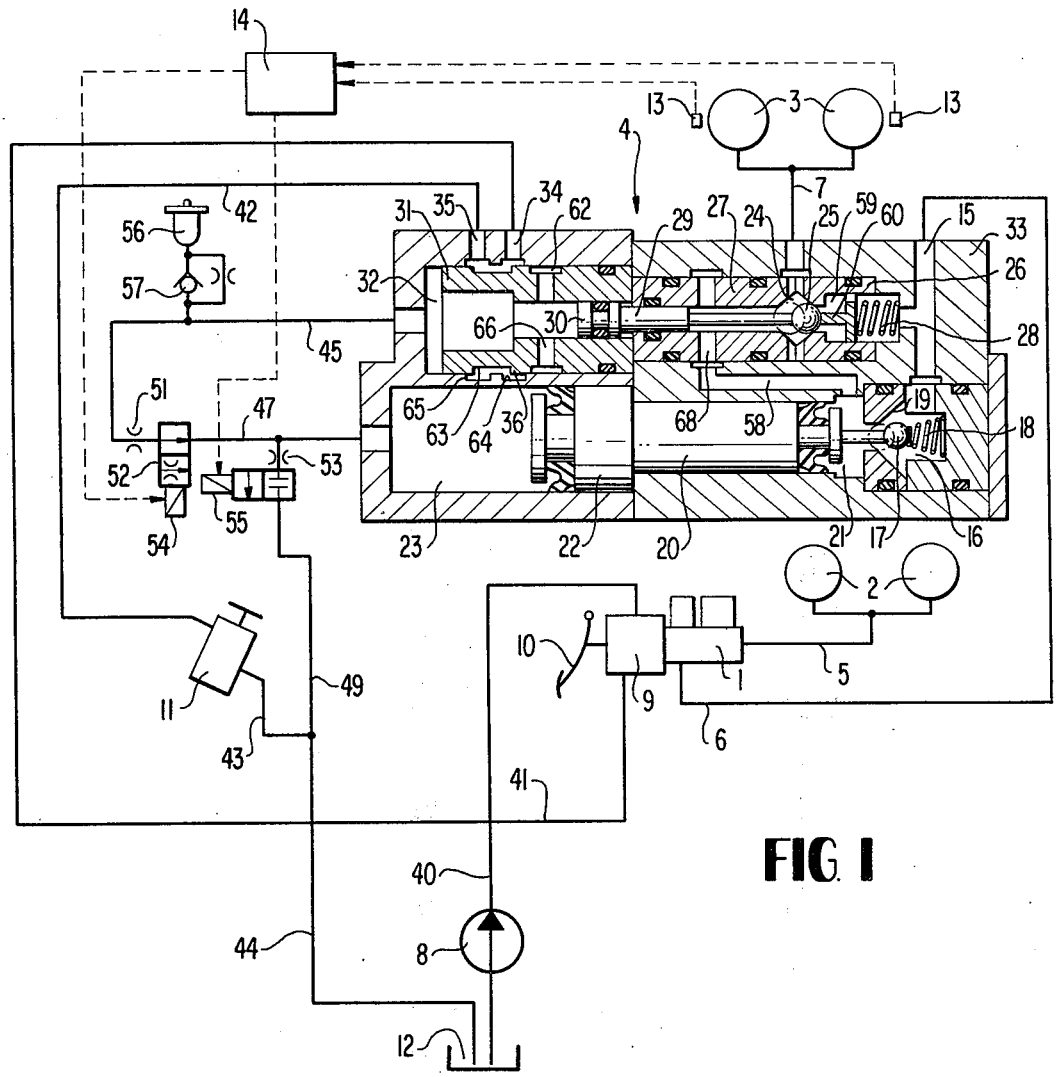
FIG. 1 is a longitudinal cross-sectional view of the actuator for the anti-skid control system according to the present invention and a schematic showing of the hydraulic circuitry associated therewith.

The anti-skid brake control system according to the present invention as shown in FIG. 1 includes a brake pedal 10 which operates a conventional master cylinder 1 through a booster 9. A first conduit 5 connects the master cylinder 1 with the front wheel brakes 2 and a second conduit 6 connects the master cylinder 1 with the inlet port 15 of the actuator 4. A pump is provided to supply fluid under pressure from the reservoir 12 to the booster 9 through the conduit 40 and thence to the inlet port 34 of the actuator 4 through the conduit 41.

The actuator 4 is comprised of a body 33 having a pair of parallel stepped bores therein. The lower bore as viewed in FIG. 1 is provided with a pressure reducing piston 20 in the smaller diameter portion thereof which defines the pressure reducing chamber 21 at one end thereof. The opposite end of the pressure reducing piston 20 is disposed in engagement with a power piston 22 which is disposed in the larger diameter portion of the bore which defines a pressure chamber 23. The pressure reducing piston 20 is provided with a projection at the right-hand end thereof which is adapted to protrude through the aperture in the valve seat 19 for engagement with a ball 17 of a cut-off valve disposed in the chamber 16 which is disposed in communication with the inlet port 15. A spring 18 is provided in the chamber 16 for normally biasing the ball 17 into engagement with the valve seat 19 as shown in dotted lines to shut off communication between the chamber 16 and the pressure reducing chamber 21.

The upper bore of the actuator 4 as viewed in FIG. 1 is provided with two sliding valve seat members 26 and 27 each having central coaxial bores extending therethrough. The abutting ends of the valve seat members 26 and 27 are provided with recesses which define a valve chamber 24 in which the ball 25 of a cut-off valve is operatively disposed. The valve chamber 24 is disposed in communication through a port in the body 33 with the conduit 7 leading to the rear wheel brakes 3. A retainer 60 is slidably mounted in a chamber 59 defined within the valve seat member 26 and is normally biased into engagement with the ball 25 by means of the spring 28. The chamber 59 is disposed in fluid communication with an inlet port 15 and the valve chamber 24. The valve seat member 27 is provided with a radial passage which communicates the bore of the valve seat member 27 with one end of the passage 58 in the body 33. The opposite end of the passage 58 is disposed in communication with the pressure reducing chamber 21.

Figure 2:
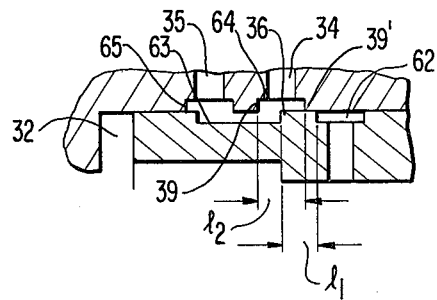
FIG. 2 is an enlarged cross-sectional view showing the details of the throttle valve means in the actuator of FIG. 1.

The left-hand end of the valve seat member 27 is disposed in engagement with a hollow piston 31 slidably disposed in the larger diameter portion of the upper bore which defines the chamber 32 at the left-hand end thereof. Two annular grooves 62 and 63 are provided about the circumference of the piston 31 with a land 36 interposed therebetween as best shown in FIG. 2. Another pair of annular grooves 64 and 65 are provided about the inner periphery of the larger diameter portion of the upper bore in the body 33 which are in fluid communication with the inlet and outlet ports 34 and 35, respectively. The groove 62 is communicated with the central bore of the hollow piston 31 by way of a through-hole 66. As best seen in FIG. 2, the land 36 has a width $l_1$ smaller than the width $l_2$ of the groove 64 so that when the land 36 is disposed between the edges 39' and 39 of the groove 64, first and second throttle valves, respectively, will be defined for controlling the flow of fluid under pressure from the inlet port 34 to the grooves 62 and 63, respectively.

A piston 30 is slidably disposed within the central bore of the hollow piston 31 in engagement with the piston 29 which is slidably disposed within the central bore of the valve seat member 27. The piston 29 is disposed in engagement with the ball 25 of the cut-off valve which will normally be disposed in the dotted line position as shown in FIG. 1 under the influence of the spring 28.

A conduit 45 communicates a chamber 32 with the electromagnetic valve 54 through the throttle 51. The electromagnetic valve 54 is provided with a through passage in one position and a throttle passage 52 in a second position. The conduit 47 connects the outlet of the electromagnetic valve 54 with the pressure chamber 23 of the actuator. The second electromagnetic valve 55 having on-off position is connected to the conduit 47 through a throttle 53 and is connected to the reservoir 12 by conduits 49 and 44. A pressure accumulator 56 is connected to the conduit 45 by means of a check valve 57 having a throttled bypass. The electromagnetic valves 54 and 55 are operable under the control of a computer 14 which in turn is electrically connected to the rear wheel sensors 13 as shown by the dotted lines in FIG. 1.

The outlet port 35 of the actuator 4 is connected to the power steering by way of conduit 42 and the power steering in turn is connected to the reservoir 12 by means of conduits 43 and 44.

The modes of operation will be described hereinafter.

The Normal Operation

When the brake pedal has not been actuated but the motor is running so that the pump 8 is operating, the actuator 4 of the anti-skid control device will be disposed as shown in the drawings with the balls 17 and 25 of the cut-off valves being positioned as shown in dotted lines. The discharge stream from the pump 8 flows through the conduit 40, booster 9, conduit 41, inlet port 34, grooves 64, 63 and 65, outlet port 35, conduit 42, power steering 11, and conduits 43 and 44 to the reservoir 12. Assuming the situation where the power steering 11 is operated so as to raise the level of the hydraulic discharge pressure from the pump 8, the land 36 as viewed in FIG. 2 will still be disposed in overlapping relation with respect to the edge 39' of the groove 64. Since the foot pedal 10 is not operated at this time, the various elements of the actuator 4 will remain in the position as shown since the chamber 32 will remain cut off from the pump pressure.

When the brake pedal 10 is depressed to produce a hydraulic pressure in the master cylinder 1, the hydraulic pressure will be transmitted by way of the conduit 5 directly to the front wheel brakes 2 thereby apply a braking action thereto. Hydraulic pressure from the master cylinder 1 will also be transmitted through the conduit 6 to the inlet port 15 of the actuator 4. Since both balls 25 and 17 of the cut-off valves are at this time disposed in the dotted line position, the hydraulic fluid under pressure will pass from the inlet port 15 through the chambers 59 and 24 and through the conduit 7 to the rear wheel brakes 3. The hydraulic pressure within the chamber 59 will also act on the valve seat member 26 thereby shifting the valve seat member 26, the valve seat member 27 and the piston 31 to the left as viewed in FIG. 1. As a result, the land 36 will be shifted beyond the edge 39' of the groove 64 to provide an open passage between the grooves 64 and the grooves 62 thereby allowing the transmission of fluid pressure from the inlet port 34 to the chamber 32. The hydraulic pressure within the chamber 32 will bias the pistons 30 and 29 to the right to force the ball 25 from the dotted line position to the solid line position against the force of the spring 28 to seat the ball on the seat 26 and interrupt communication between the chamber 59 and the valve chamber 24.

Simultaneously, the hydraulic pressure within the chamber 32 will be transmitted through the conduit 45, throttle 51, electromagnetic valve 54 and the conduit 47 to the pressure chamber 23. The hydraulic pressure in the chamber 23 will force the power piston 22 and the pressure reducing piston 20 to the right as viewed in FIG. 1 to shift the ball 17 of the cut-off valve from the dotted line position to the full line position away from the seat 19 to provide communication between the chambers 16 and the pressure reducing chamber 21. As a consequence, the hydraulic pressure at the inlet port 15 will then pass through the chamber 16, the opening between the ball 17 and the seat 19 into the pressure reducing chamber 21. The pressure will then be transmitted from the chamber 21 through the passage 58, passage 68, the central bore of the valve seat member 27, the valve chamber 24 and the conduit 7 to the rear wheel brakes 3.

It should be noted that the shifting of the respective balls 17 and 25 of the cut-off valves from the positions shown by dotted lines to the positions shown by solid lines takes place instantaneously immediately after depression of the brake pedal 10 and both balls are maintained in the solid line positions throughout the normal braking action.

Since the land 36 as best shown in FIG. 2 is provided with a width $l_1$ smaller than the width $l_2$ of the groove 64, a gap will still be provided between the left end of the land as viewed in FIG. 2 and the other edge 39 of the groove 64. Thus, although the pump pressure at the inlet port 34 will be transmitted to the chamber 32 passed the edge 39', the pump pressure will also be introduced passed the edge 39 through the grooves 63 and 65, through the outlet port 35 and the conduit 42 to the power steering 11 and eventually to the reservoir 12. Thus, an input hydraulic pressure is provided without interruption to the power steering 11 for the duration of the braking action. Upon interruption or termination of the braking action, the sequence of operations thus far described will be reversed and the various components will return to their original positions.

Anti-Skid Operation

If a signal is transmitted from the sensors 13 to the computer 14 indicating a wheel lock condition, the computer 14 will provide signals to actuate both electromagnetic valves 54 and 55 from the positions illustrated in FIG. 1 to the alternate positions, respectively. Since the brake pedal 10 is depressed, the hydraulic pressure of the master cylinder is applied at the inlet port 15 and the balls 17 and 25 of the cut-off valves are disposed in the solid line positions. Likewise, hydraulic pressure is being applied from the inlet port 34 to the chambers 32 and 23. After the actuation of the electromagnetic valves 54 and 55, the hydraulic pressure from the chamber 32 will pass through the conduit 45, the throttle 51, the throttle 52 of the electromagnetic valve 54 to the pressure chamber 23. At the same time, hydraulic pressure be directed through the throttle 53, the through passage of electromagnetic valve 55, and the conduits 49 and 44 to the reservoir 12. Due to the reduction of pressure within the pressure chamber 23, the power piston 22 will be forced to the left as view in FIG. 1 at a speed which is determined by the effective areas of the throttles and the force of the spring 18. As a result of the leftward movement of the power piston 22 and the pressure reducing piston 20, the ball 17 will seat on the valve seat 19 thereby cutting off communication between the chamber 16 and the pressure-reducing chamber 21. The pressure within the chamber 21 will be reduced due to the increase of the capacity thereof and consequently the pressure in the rear wheel brakes will be decreased through the hydraulic pressure circuit consisting of passage 58, passage 68, valve chamber 24 and conduit 7. When the skid inducing condition in the rear wheel brakes ceases as a result of the pressure reduction, both electromagnetic valves 54 and 55 will be returned to their positions as shown in FIG. 1 and the pressure in the chamber 23 will be increased. Thus, the power piston 22 and the pressure reducing piston 20 will be moved to the right to urge the ball 17 to the open position whereby the pressure within the pressure reducing chamber 21 will be increased along with an increase of pressure in the rear wheel brakes. The rapid pressure recovery in the pressure reducing chamber 21 is effected by bringing both electromagnetic valves 54 and 55 to their off-positions. When the electromagnetic valves 55 alone is brought to its off-position with the other electromagnetic valve 54 remaining in its on-position, a slow pressure recovery in the pressure reducing chamber 21 and the rear wheel brakes will result. The above-described cycle of pressure-reduction and pressure-recovery is repeated in the well-known manner for effecting an anti-skid braking operation.

Safety Valve Operation

In the event that the pressure in the chamber 32 is abnormally decreased due to a malfunctioning of the pump 8 or conduit 41, the ball 25 will be shifted into engagement with the seat 27 due to the input hydraulic pressure from the master cylinder at the inlet port 15. Since the pressure within the chamber 23 is decreased concurrently, the power piston 22 and associated members will be shifted to the left so that they ball 17 will be moved to its closed position in engagement with the seat 19. Consequently, the input hydraulic pressure from the inlet port 15 will be transmitted through the bypass circuit consisting of the chamber 59, valve chamber 24 and the conduit 7 to the rear wheel brakes 3, thus insuring a safe braking operation. In the event that an input hydraulic pressure is not supplied to the booster 9 due to the failure of the pump, then the hydraulic pressure from the master cylinder which is produced only by the force exerted on the pedal will be fed to the booster 9. Similar safety means are provided in the power steering 11 but have not been illustrated since they do not provide a part of the present invention.

The principal feature of the present invention resides in the provision of the throttle valves which are shown in the enlarged detailed view of FIG. 2. When the balls 25 and 17 assume the position shown by the dotted lines, respectively, a hydraulic pressure within the chamber 32 and the hydraulic pressure at the inlet port 15 are proportioned to each other. More specifically, if the power steering 11 has been placed in operation when the brake pedal is depressed and the discharge pressure in the conduits 40 and 41 which comes from the pump 8 has been raised to a substantially high level, then a considerably high level of hydraulic pressure is obtained within the chamber 32 due to the shifting of the land 36 to its open position, that is with the clearance between the land 36 and the shoulder 39'. Thus, the force of the hydraulic pressure within the chamber 32 which acts on the piston 31 in a rightward direction as viewed in FIG. 1 is proportionately increased so that the gap between the land 36 and the edge 39' will be narrowed. The leftward movement of the piston 31 and valve seat members 26 and 27 under the influence of the inlet pressure at 15 will be stopped at a point at which the open path between the land 36 and the edge 39' is regulated so that the hydraulic pressure within the chamber 32 and the hydraulic pressure at the inlet port 15 may be brought into the desired proportional relationship. The ball 25 at the same time will be subjected to the hydraulic pressure within the chamber 32 through the pistons 30 and 29 so that the ball 25 will remain seated on the valve seat member 26 thereby overcoming the force of the spring 28 as well as the hydraulic pressure in the inlet port 15.

On the contrary, if the hydraulic pressure in the chamber 32 is too low, for example, when the brake pedal is depressed and the power steering is not operated, the force due to the hydraulic pressure within the chamber 32 which acts on the piston 31 to move the same to the right, is lowered accordingly. This increases the extent of leftward movement of the piston 31 so that a large open path will be provided between the land 36 and the edge 39' while the gap between the land 36 and the edge 39 is narrowed thus raising the hydraulic pressure at the inlet port 34. As a result, the hydraulic pressure within the chamber 32 and the force which urges the piston 31 to the right are increased to such an extent that the position of the land 36 relative to the edge 39' may be regulated so as to bring the level of hydraulic pressure within the chamber 32 into the desired proportion with that in the inlet port 15.

Since the hydraulic pressure at the inlet port 34 which is provided by the pump 8, whether its level is excessively high or low, is adjusted by adjusting the position of the land 36 relative to the edge 39', a hydraulic pressure proportional to the hydraulic pressure from the master cylinder in the inlet port 15 is always obtained in the chamber 32.

Proportioning of the hydraulic pressure is also obtained between the chamber 23 and the chamber 16. Stated otherwise, if a discharge pressure from the pump to the actuator should change dependent upon the condition of operation of hydraulic equipment disposed in the same hydraulic pressure system as that of the actuator but downstream thereof, the actuator-operating hydraulic pressure within the chambers 32 and 23 is automatically adjusted to a level proportional to the level of hydraulic pressure from the master cylinder at that time.

The actuator is operated in response to a pressure difference between the hydraulic pressure at the inlet port 15 and the hydraulic pressure within the respective chambers 32 and 23. An increase in the hydraulic pressure in any one of the inlet ports and chambers to an abnormally high level leads to a lowered responsiveness of the actuator.

According to the present invention, the level of the actuator-operating pressure and the level of hydraulic pressure from the master cylinder are set to a desired pressure difference so that the responsiveness of the actuator is greatly enhanced. By virtue of the action for adjusting the operating hydraulic pressure, any type of hydraulic equipment may be disposed in the same circuit with the actuator downstream thereof without a risk of failure to bring the actuator-operating hydraulic pressure into the desired proportion with the hydraulic pressure from the master cylinder. The device of the present invention is thus usable without difficulty in combination with other types of hydraulic equipment.

While the invention has been particularly shown and described with respect to a preferred embodiment thereof, it will be understood by those in the art that various changes in form and details may be made therein without departing from the spirit and scope of the invention.

What is claimed is:

1. A brake system comprising first fluid circuit means including fluid pressure source means, operator actuated master cylinder means fluidically connected with said pressure source means, wheel brake cylinder means fluidically connected with said master cylinder means and actuator means including control valve means for controlling fluid pressure from said master cylinder means to said wheel brake cylinder means and power piston means operatively associated with said control valve means and second fluid circuit means including said fluid pressure sources means, reservoir means, auxiliary fluid pressure operated means disposed between said pressure source means and said reservoir means and throttle valve means disposed between said auxiliary fluid pressure operated means and said pressure source means and further fluidically connected with said power piston means of said actuator means; said throttle valve means including a first throttle valve disposed between said auxiliary fluid pressure operated means and said pressure source means for throttling the pressure downstream of said first throttle valve in response to the pressure from said master cylinder means and a second throttle valve disposed between said power piston means of said actuator means and said pressure source means for throttling the pressure downstream of said second throttle valve in response to the actuation of said first throttle valve.

2. A brake system as set forth in claim 1 wherein said actuator means is provided with a first elongated bore, a first inlet port connected to said master cylinder means and a first outlet port connected to said wheel brake cylinder means disposed in communication with said first bore adjacent one end thereof, a second inlet port connected to said fluid pressure source means and a second outlet port connected to auxiliary fluid pressure operated means disposed in communication with said first bore adjacent the opposite end of said first bore, first piston means slidable in said first bore in response to fluid pressure from said master cylinder means to one end thereof, means on the opposite end of said first piston means defining with said second inlet and outlet ports said throttle valve means for controlling the flow of fluid under pressure from said fluid pressure source means to said opposite end of said power piston means and said auxiliary fluid pressure operated means, a second bore in said actuator means, second piston means including said power piston slidable in said second bore with one end of said second bore disposed in communication with said first inlet port means, first conduit means connecting said one end of said first bore with said one end of said second bore, second conduit means connecting the opposite end of said first bore with said opposite end of said second bore, said control valve means comprising a first cut-off valve means disposed in said first bore adjacent said one end thereof and a second cut-off valve means disposed in said second bore adjacent said one end thereof for controlling communication between said first inlet port and said first outlet port through one of said first and second bores, additional piston means slidably mounted in said first piston means with one end operatively engaging said first cut-off valve and the other end exposed to fluid pressure in the said opposite end of said first bore, said second cut-off valve means being operatively engaged by said second piston means.

3. A brake system as set forth in claim 2 wherein said means defining said throttle valve means is comprised of first and second circumferential grooves in the surface of said first bore communicating with said second inlet port and said second outlet port, respectively, a third circumferential groove in the periphery of said first piston means providing communication between said first and second grooves, a fourth groove on the periphery of said first piston means spaced from said third groove by a land having a width less than the width of the first groove whereby said first groove can simultaneously communicate with said third and fourth grooves and passage means connecting said fourth groove with said opposite end of said first piston means.

4. A brake system as set forth in claim 2 further comprising electromagnetic valve means for controlling the flow of fluid pressure in said second conduit means between said first and second bores and between said second bore and said fluid pressure source means, wheel sensor means and computer means operatively connected to said wheel sensor means and said electromagnetic valve means for controlling said electromagnetic valve means in response to signals received from said wheel sensor means.

5. A brake system as set forth in claim 4 further comprising third conduit means interconnecting said opposite end of said second bore with said fluid pressure source means, first throttle means in said second conduit means and second throttle means in said third conduit means; said electromagnetic valve means comprising a first electromagnetic valve in said second conduit means intermediate said first throttle means and said second bore and a second electromagnetic valve in said third conduit means intermediate said second throttle means and said fluid pressure source means.

6. A brake system as set forth in claim 5 wherein said first electromagnetic valve is provided with a through-passage adapted to be disposed in said second conduit means in the unactuated condition of said first electromagnetic valve and a second restricted passage adapted to be disposed in said second conduit means in the actuated condition of said first electromagnetic valve and wherein said second electromagnetic valve is provided with a blocked passage adapted to be disposed in said third conduit means in the unactuated condition of said second electromagnetic valve and a through-passage adapted to be disposed in said third conduit means in the actuated condition of said second electromagnetic valve.

* * * * *